United States Patent [19]

Kohl et al.

[11] Patent Number: 5,280,232

[45] Date of Patent: Jan. 18, 1994

[54] METHOD AND APPARATUS FOR VOLTAGE REGULATION DEPENDING ON BATTERY CHARGE

[75] Inventors: Walter Kohl, Bietigheim; Rainer Mittag, Kornwestheim, both of Fed. Rep. of Germany

[73] Assignee: Robert Bosch GmbH, Stuttgart, Fed. Rep. of Germany

[21] Appl. No.: 779,932

[22] Filed: Oct. 21, 1991

[30] Foreign Application Priority Data

Nov. 30, 1990 [DE] Fed. Rep. of Germany ....... 4038225

[51] Int. Cl.$^5$ .............................................. H02J 7/16
[52] U.S. Cl. ........................................ 322/23; 320/64; 322/28; 322/8; 322/29
[58] Field of Search ............... 322/7, 8, 3, 28, 29; 320/64

[56] References Cited

U.S. PATENT DOCUMENTS

| | | | |
|---|---|---|---|
| 4,322,630 | 3/1982 | Mezera et al. | 290/40 C |
| 4,323,837 | 4/1982 | Nakamura et al. | 322/7 |
| 4,423,378 | 12/1983 | Marino et al. | 320/48 X |
| 4,682,097 | 7/1987 | Matsui | 322/29 X |
| 4,968,942 | 11/1990 | Palanisamy | 324/430 |

Primary Examiner—R. J. Hickey
Attorney, Agent, or Firm—Michael J. Striker

[57] ABSTRACT

The method of regulating a voltage produced by a generator with a voltage regulator according to a battery charge state includes providing a controller containing a clock and a memory able to store battery and power supply reference data, battery voltage and generator rotation speed; maintaining a regulated voltage produced by the generator at a normal value ($U_R$) during a first time interval (t1); measuring a battery voltage ($U_B$) and decreasing the regulated voltage ($U_R$) during a second time interval (t2); determining the battery charge state from the measured battery voltage ($U_B$) according to the stored battery- and power supply-reference data; and, when the battery charge state is determined to be unsatisfactory, determining an additional time interval (t4) with the controller and an amount of increase of the regulated voltage ($U_R$) sufficient to obtain a satisfactory battery charge state during the additional time interval (t4) without damaging the voltage sensitive components of the voltage regulator; and increasing the regulated voltage above the normal value ($U_R$) by the thus determined amount and turning on no voltage-critical consuming device during the additional time interval (t4). A voltage regulator including the controller is also described.

15 Claims, 2 Drawing Sheets

METHOD AND APPARATUS FOR VOLTAGE REGULATION DEPENDING ON BATTERY CHARGE

BACKGROUND OF THE INVENTION

The present invention is based on a method and apparatus for voltage regulation depending on the charge state of a battery, especially for regulation of a voltage produced by a generator, which charges the battery and supplies consuming devices.

Methods and devices for controlling the voltage produced by a generator, which is required for charging a battery and supplying consuming devices, are known.

The charge of a battery in a motor vehicle can decrease to an undesirably low value, because of critical vehicle conditions, particularly when the vehicle has a low speed and simultaneously the connected consuming devices are consuming a high power. For reliable voltage regulation it is necessary to detect and consider the power supply load and the actual charge of the battery. It is also necessary to determine the charge on the battery in different time intervals as is set forth, for example, in German Published Patent Application 32 43 075. The battery can be separated from the power supply for a short time by an electronic controller and connected with a test resistor. The voltage, which exists between the battery terminals, can be used as a measure of the charge of the battery considering the battery temperature. If it is determined that the charge state of the battery is under a certain permitted value, suitable measures can be taken, for example, the rotational speed of the engine can be increased or the consuming device load can be reduced so that the charge state can improved during the following vehicle time.

It is disadvantageous that the battery be separated from the power supply net during the regulation of the voltage from the generator. Furthermore, if it is so disconnected, no information can be obtained on the size of the power supply network load.

SUMMARY OF THE INVENTION

It is an object of the present invention to provide a method and apparatus for regulation of a voltage produced by a generator and supplied to consuming devices and a rechargeable battery, in part for recharging the battery according to the charge state of the battery.

This object, and others which will be made more apparent hereinafter, is attained in a method for voltage regulation depending on a charge state of a battery, comprising controlling, by a voltage regulator, a voltage produced by a generator connected with the battery and consuming devices, the voltage being required for charging the battery and for supplying power to the consuming devices.

According to the invention the method comprises the steps of:

a) providing the voltage regulator with controller means containing a memory able to store battery and power supply reference data, battery voltage and rotation speed of the generator and also containing a time measuring device;

b) setting a first time interval (t1) with the controller means;

c) maintaining a regulated voltage produced by the generator at a normal value ($U_R$) during the first time interval (t1);

d) setting a second time interval (t2) immediately following the first time interval (t1) with the controller means;

e) decreasing the regulated voltage ($U_R$) during the second time interval (t2) and measuring a battery voltage ($U_B$) to follow a decrease in the battery voltage;

f) after performing step e), determining the charge state of the battery from the battery voltage ($U_B$) measured in step e) with the controller means according to the stored battery- and power supply-reference data; and g) when the charge state of the battery is determined to be unsatisfactory in step f), determining an additional time interval (t4) with the controller means and an amount of increase of the regulated voltage ($U_R$) sufficient to obtain a satisfactory charge state of the battery during the additional time interval (t4) without damaging the voltage sensitive components of the voltage regulator;

h) after performing step g), increasing the regulated voltage above the normal value ($U_R$) by the amount determined in step g) for the additional time interval (t4) determined in step g) and turning on no voltage-critical consuming device during the additional time interval (t4).

"An unsatisfactory charge state" is defined as a charge state in which the charge on the battery has fallen so low that it is below a certain threshold necessary to operate consuming devices. A voltage-critical consuming device is defined as one which creates a substantially drain on the battery charge.

The method also includes providing a switching transistor in the voltage regulator, determining an on/off ratio of the switching transistor and from the on/off ratio determining a load on the power supply means including the battery.

Advantageously, both the power supply load and also the charge state of the battery are separately measured from each other. The obtained measurement results are directly utilized in the voltage regulation using the controller.

In advantageous additional embodiments of the invention the method also includes signalling a driver of a motor vehicle containing the battery and generator, when the charge state of the battery is unsatisfactory. Alternatively, the method can include signalling and shutting off unnecessary consuming devices, when the charge state of the battery is unsatisfactory. This can be done automatically by controller action or by the driver activating a switch upon reading an indicating device. Unnecessary consuming devices are defined as those which are not essential for vehicle operation, for example a radio or tape unit. Under certain conditions these devices may include lights.

This object is also attained in an apparatus for performing the above described method including a voltage regulator connected to a generator for controlling a voltage produced by the generator, the voltage being required to charge the battery and supply consuming devices. The voltage regulator includes a controller and at least one indicating device connected to the controller, the controller being connected to the battery and the generator to receive a battery voltage and a generator rotation speed.

According to one aspect of the present invention, the controller includes a memory, the memory being able to store battery and power supply reference data, and the controller has a time measuring device and is structured to determine the charge state of the battery according to a measured battery voltage. Furthermore the controller includes control means by which the charge state of the battery can be changed, when the charge state of the battery is found to be unsatisfactory.

The controller also includes a switching transistor having an on/off ratio connected to the controller so as to supply the on/off ratio to the controller, and is structured to determine a power supply load from the on/off ratio and the generator rotation speed.

The apparatus can also include a control device for control of an internal combustion engine connected to the controller. The control device can be advantageously connected to the controller by a data bus. Alternatively, a portion of a control device used for control of an internal combustion engine can be structured as the controller.

The controller can advantageously comprise a microprocessor.

In the method of the invention, if a load which is too high is detected, or an unsatisfactory, i.e. low, charge state, suitable steps are taken, after the situation is detected, to remedy the situation. For example, when the driver is informed that the load is too great by the apparatus, he can cut off consuming devices which are not necessary, i.e. essential for vehicle operation at the time. It is also possible to arrange for automatic shut off of certain devices, such as the radio. Also the control device, which controls the motor vehicle operation, can be induced to increase the idle speed of the vehicle.

An additional improvement results, when the regulated voltage is increased, if certain voltage sensitive consuming devices are turned on.

It is of particular advantage when the power supply load is determined in the standard operating state and the determination of the charge state of the battery succeeds with only slightly reduced regulated voltage, so that the generator remains in an excited condition and the separation of the battery from the power supply circuit is not required.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE INVENTION

Figure 1:
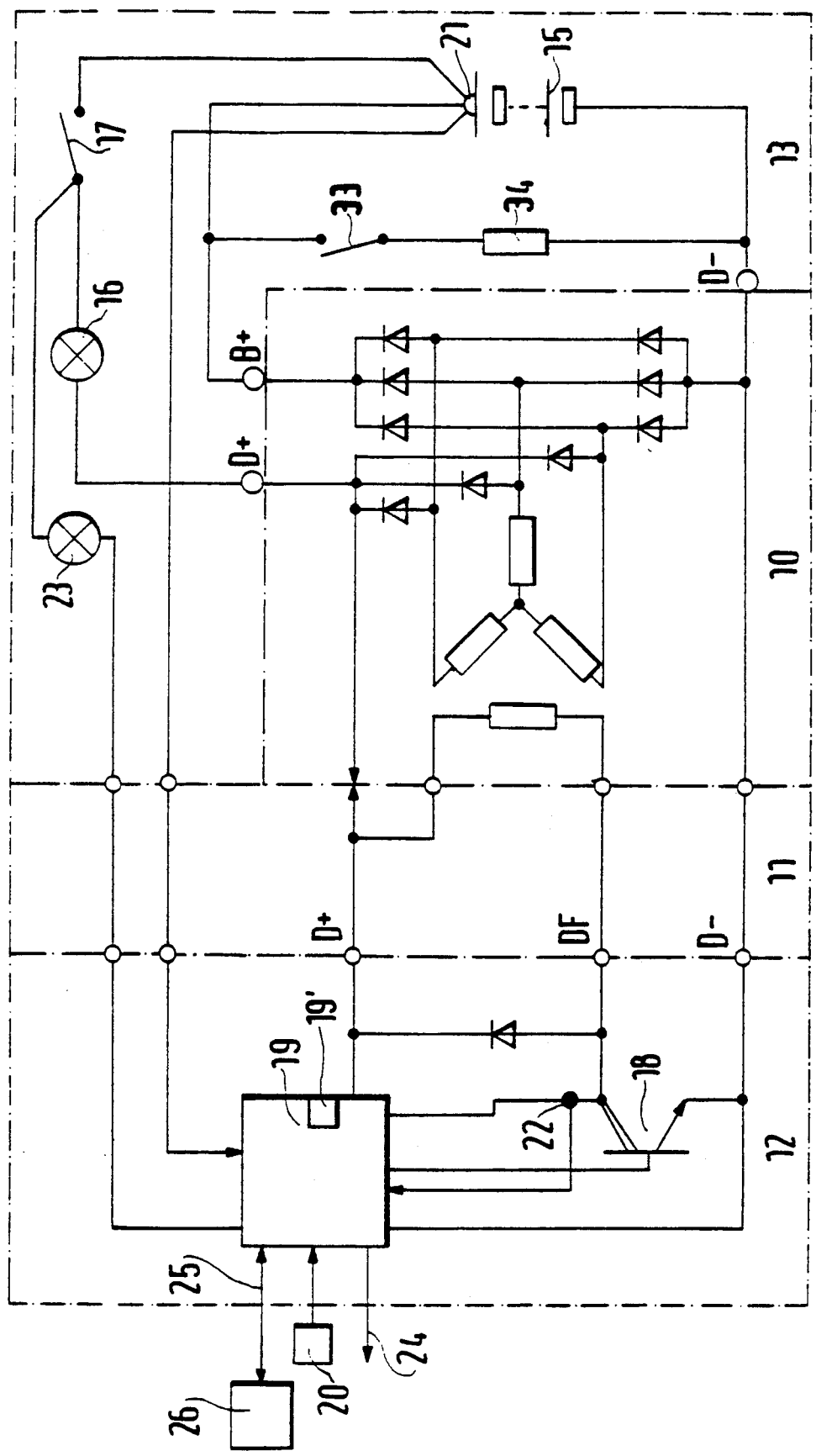
FIG. 1 is a circuit diagram of an apparatus for controlling the voltage produced by a generator according to the present invention.

An A.C. alternator 10 is connected by the brush holder 11 with the voltage regulator 12 as shown in FIG. 1. Furthermore, the A.C. alternator 10 is connected by the terminal B+ with the power supply circuit or means 13, which in the embodiment shown includes battery 15, a switch 33, a switch 17 and resistor 34. A battery 15, which is rechargeable, is part of the power supply means 13. The positive pole of the battery is connected to the terminal B+ and its negative pole is connected to the terminal D− of the A.C. alternator 10.

The A.C. alternator 10 is connected with a charge control lamp 16 by the terminal D+, which for its part is connected through the ignition switch 17 to the positive pole of the battery 15.

The switching transistor 18 and the controller 19 are both essential components of the voltage regulator 12. The controller 19 contains at least one integrated circuit, usually a suitable microprocessor, which contains at least one memory.

Data is fed to the controller 19 regarding the battery voltage, rotational speed of the generator, switching state of the switching transistor 8 and so forth. To obtain this data a number of suitable sensors, e.g. a rotational speed sensor 20, a sensor 22 for measurement of the on/off ratio of the switching transistor 18 and a voltage sensor 21 for measurement of the battery voltage are used. It is sufficient when the voltage of the battery is read by a line, which is connected to the positive pole of the battery 15.

An indicating device 23 is provided for the driver to indicate a failure or error condition. This indicating device 23 can be designed as an LED device and is connected with the controller 19 and with the battery remote connector of the ignition switch 17.

The controller 19 of the voltage regulator 12 is connected with an unshown control unit of the vehicle by a connector 24. The least important consuming device can be automatically separated from the power supply by a switch according to the circuit 13 or can be released by this control unit according to previously supplied data from the controller 19 for control of the rotation speed.

The controller 19, which for example contains a microprocessor or a uC, controls the excitation current of the generator via switching transistor 18 and thus the output voltage of the generator. The remaining control and switching functions are activated by the controller 19. Furthermore, time measurements for setting certain time intervals t1 to t4 takes place in a time measuring device or clock unit 19' of the controller 19. Furthermore voltage comparison takes place in the controller 19, so the measured battery voltage is compared with a threshold voltage for activation of the indicating device 34 when the threshold voltage is greater than the measured battery voltage.

When a central control device 26 is also present in the motor vehicle, which performs the required control and/or regulation, it is also possible to use a simplified controller 19 of the voltage regulator 12 and, because of that, to take a portion of the foregoing previously required central control device 26 for voltage regulation, time measurement, voltage comparisons and the like. Additionally the controller 19 is connected by a data bus 25 with central control device (26), so that the data bus 25 can conduct data in both directions.

Figure 2:
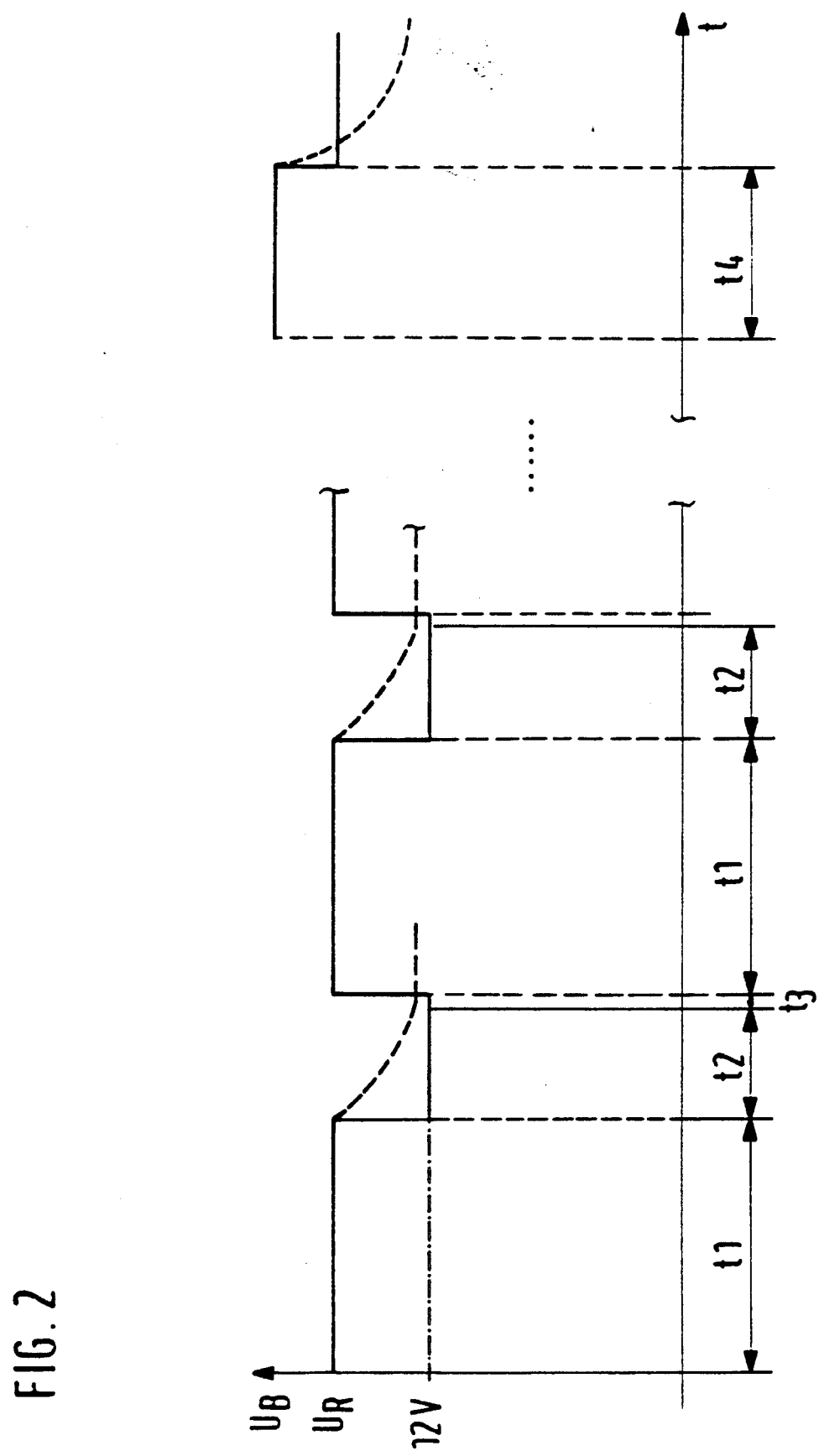
FIG. 2 is a graphical illustration of the course of battery voltage versus time used to explain the method for voltage regulation according to the present invention.

The operation of the circuit shown in FIG. 1 is now made clear with the aid of FIG. 2, in which the course of the battery voltage $U_B$ is shown versus time.

During the time interval t1 the voltage regulator 12 is in its normal regulating state. The battery voltage thus corresponds to the standard regulated voltage amounting with a 12 volt power supply network to a voltage of about 14.2 volts. Then, during the time t2, the regulated voltage drops, for example, to a value or 12 volts. Then adjusting battery voltage $U_B$ is measured. If the regulated voltage $U_R$ is again increased to its normal value $U_R$ after a time interval t3, then the battery voltage returns to the same value $U_B$ again.

During the time interval t1 in the controller 19 the power supply load is determined from the generator rotation speed and from the on/off ratio, which is read at the switching transistor 18. The higher the power supply load is, i.e. more consuming devices are switched on, the less frequently and the longer the switching transistor 18 is found in its conductive state, whereby the current through the excitation coil of the generator is increased, i.e. the power supply net is supplied with more power by the battery. Because of that, the charge on the battery runs down.

During the time t2, during which the regulated voltage decreases, the voltage change in the battery 15 is evaluated and is used for determination of the charge state of the battery 15. Moreover the voltage change is compared with the battery and power supply reference data stored in the controller 19. Reliable information can be obtained from the comparison about the charge state of the battery.

If an unsatisfactory charge state of the battery is detected, measures are taken by the controller 19, which contribute to a general improvement of the charge state of the battery. Furthermore, the driver is informed of the poor charge state of the battery 15 by the illuminated indicating device 23. It cannot shut down necessary consuming devices by itself. It is also possible that the controller 19 itself can automatically shut off consuming devices which are not necessary. Also it is possible that the controller 19 induces the control device used for motor regulation to increase the motor idle speed $n_m$ and thus also the rotation speed of the generator $n_G$.

An additional possibility for improvement of the charge state of the battery is that the regulated voltage $U_R$ is increased relative to the standard regulated voltage. The controller 19 puts the switching transistor 18 in its switched on state for a longer time than in standard operation. The increase of the regulator voltage above the normal regulated voltage is then allowed only when no voltage sensitive structural components are endangered. Moreover this voltage increase occurs only during a certain predetermined time interval. In FIG. 2 during the additional time interval t4 the regulated voltage increases relative to the normal voltage.

After the additional time interval t4 expires the regulated voltage can be dropped to the lower value of 12 volts and its charged state can be determined from a new measurement of the battery voltage It is however also possible after the time t4 has expired to perform a step of the method with the normal voltage regulating height according to the step during t1.

During the time course of the battery voltage during the time t3 whether the battery has a defect or whether a batteryless operation is performed can be determined, since in both cases the voltage rapidly decreases.

The battery voltage is normally measured in the vicinity of the positive pole of the battery 21. However, the voltage can also be measured at other locations in the power supply network, for example at the battery terminal B+, for example at the terminal B+ of the generator 10.

While the invention has been illustrated and described as embodied in a method and apparatus for voltage regulation depending on battery charge, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims.

1. A method of regulating a voltage produced by a generator with a voltage regulator according to a charge state of a battery, said generator being connected to the battery and consuming devices, said voltage being required for charging the battery and for supply of the consuming devices, said voltage regulator having voltage sensitive components and said regulating of said voltage being performing by said voltage regulator, the method comprising the steps of:
 a) providing the voltage regulator with controller means containing a memory, said memory being able to store battery and power supply reference data, battery voltage and rotation speed of the generator and also containing a time measuring device;
 b) setting a first time interval (t1) with the controller means;
 c) maintaining a regulated voltage produced by the generator at a normal value ($U_R$) during the first time interval (t1);
 d) setting a second time interval (t2) immediately following the first time interval (t1) with the controller means;
 e) decreasing the regulated voltage ($U_R$) during the second time interval (t2) and measuring a battery voltage ($U_B$) of the battery to follow a resulting drop in the battery voltage;
 f) after performing step e), determining the charge state of the battery from the battery voltage ($U_B$) measured in step e) with the controller means according to the stored battery- and power supply-reference data;
 g) when the charge state of the battery is determined to be unsatisfactory in step f), determining an additional time interval (t4) with the controller means and an amount of increase of the regulated voltage ($U_R$) sufficient to obtain a satisfactory charge state of the battery during the additional time interval (t4) without damaging the voltage sensitive components of the voltage regulator; and
 h) after performing step g), increasing the regulated voltage above the normal value ($U_R$) by the amount determined in step g) for the additional time interval (t4) determined in step g) and turning on no voltage-critical consuming device during the additional time interval (t4).

2. A method as defined in claim 1, further comprising the steps of including in the voltage regulator a switching transistor (18) connected electrically to the controller means, including the battery in a power supply means connected to the consuming devices, and determining an on/off ratio of the switching transistor (18) of the voltage regulator (12) and from the on/off ratio determining a load on the power supply means including the battery.

3. A method as defined in claim 1, further comprising the step of providing an indicating device for signaling a driver of a motor vehicle containing the generator and battery, when the charge state of the battery is determined to be unsatisfactory.

4. A method as defined in claim 1, further comprising the steps of providing an indicating device for signalling a driver of a motor vehicle containing the generator and battery and shutting off unnecessary ones of the consuming devices, when the charge state of the battery is determined to be unsatisfactory.

5. A method as defined in claim 1, further comprising shutting off unnecessary ones of the consuming devices automatically, when the charge state of the battery is determined to be unsatisfactory.

6. A method as defined in claim 1, further comprising increasing a motor idle speed of a motor connected to and driving the generator, when the charge state of the battery is determined to be unsatisfactory.

7. A method as defined in claim 1, further comprising determining that the charge state of the battery is unsatisfactory, when the battery voltage is below a predetermined threshold during the second time interval (t2).

8. An apparatus for voltage regulation of a generator depending on a charge state of a battery connected to he generator, said apparatus comprising a voltage regulator connected electrically to the generator for controlling a voltage produced by the generator, said voltage being required to charge the battery and supply consuming devices connected electrically to the generator and the battery, said voltage regulator comprising:

a controller means (19) and at least one indicating device (23) connected to the controller means, the controller means including a memory structured to store battery and power supply reference data, a time measuring device, means for determining a charge state of the battery from a battery voltage, means for sensing generator speed, means for determining a power supply load of a power supply means including the battery and control means for changing the charge state of the battery, said controller means being connected to the battery and the generator to receive the battery voltage and a rotation speed of the generator; and a switching transistor (18) having an on/off ratio connected to and controlled by the controller means (19) to supply the on/off ratio to the controller means (19), wherein the means for determining the power supply load is structured to determine a power supply load from the on/off ration and the generator rotation speed.

9. An apparatus as defined in claim 8, wherein the controller means is structured to maintain a regulated voltage ($U^R$) during a first time interval (t1) determined by the time measuring device.

10. An apparatus for voltage regulation of a generator driven by an internal combustion engine according to a charge state of a battery connected to the generator, said apparatus comprising a voltage regulator connected electrically to the generator for controlling a voltage produced by the generator, said voltage being required to charge a battery and supply consuming devices connected electrically to the generator, said voltage regulator comprising:

a portion of control device (26) of the internal combustion engine, said portion containing a time measurement device and voltage comparison means;

a controller means (19) connected to said portion and at least one indicating device (23) connected to the controller means, the controller means including a memory structured to store battery and power supply reference data, means for determining a charge state of the battery from a battery voltage, means for determining power supply load of a power supply means containing the battery and control means for changing the charge state of the battery, said controller means being connected tot he battery and the generator to receive the battery voltage and a rotation speed of the generator; and a switching transistor (18) having an on/off ratio connected tot he controller means (19) and supplying the on/off ratio to the controller means (19), mean for sensing generator speed connected to and controlled by said switching transistor, wherein the means for determining the power supply load is structured to determine a power supply load from the on/off ratio and the generator rotation speed.

11. An apparatus as defined in claim 10, further comprising a data bus (25) connecting the control device (26) and the controller means (19).

12. An apparatus as defined in claim 8, wherein a portion of the controller means (19) is structured as a control device (26) for control of an internal combustion engine, said internal combustion engine connected to the generator to drive the generator.

13. An apparatus as defined in claim 8, wherein the controller means (19) comprises a microprocessor.

14. A method as defined in claim 1, further comprising determining that the charge state of the battery is not satisfactory when a charge in the battery is below a certain predetermined threshold value.

15. An apparatus as defined in claim 10, wherein the controller means (19) comprises a microprocessor.

* * * * *